(12) United States Patent
Larson (10) Patent No.: US 9,937,671 B2
(45) Date of Patent: Apr. 10, 2018

(54) ALL-COMPOSITE TORQUE TUBE WITH METAL EYELETS

(71) Applicant: Moog Inc., East Aurora, NY (US)

(72) Inventor: Lowell Van Lund Larson, Huntington Beach, CA (US)

(73) Assignee: Moog Inc., East Aurora, NY (US)

( * ) Notice: Subject to any disclaimer, the term of this patent is extended or adjusted under 35 U.S.C. 154(b) by 177 days.

(21) Appl. No.: 14/996,922

(22) Filed: Jan. 15, 2016

(65) Prior Publication Data

US 2017/0203521 A1 Jul. 20, 2017

(51) Int. Cl.
| | |
|---|---|
| *B29C 70/30* | (2006.01) |
| *B29C 70/32* | (2006.01) |
| *B29C 35/02* | (2006.01) |
| *B29C 70/22* | (2006.01) |
| *B64D 35/00* | (2006.01) |
| *F16C 3/02* | (2006.01) |
| *B29C 70/86* | (2006.01) |
| *B29K 101/10* | (2006.01) |
| *B29K 105/08* | (2006.01) |
| *B29L 23/00* | (2006.01) |
| *B29L 31/30* | (2006.01) |
| *B29L 31/00* | (2006.01) |

(52) U.S. Cl.
CPC ............. *B29C 70/30* (2013.01); *B29C 35/02* (2013.01); *B29C 70/222* (2013.01); *B29C 70/32* (2013.01); *B29C 70/86* (2013.01); *B64D 35/00* (2013.01); *F16C 3/026* (2013.01); *B29K 2101/10* (2013.01); *B29K 2105/08* (2013.01); *B29K 2105/0872* (2013.01); *B29K 2995/0082* (2013.01); *B29L 2023/005* (2013.01); *B29L 2031/3076* (2013.01); *B29L 2031/75* (2013.01)

(58) Field of Classification Search
CPC ................................. B29C 70/30; B29C 70/32
See application file for complete search history.

(56) References Cited

U.S. PATENT DOCUMENTS

| | | | |
|---|---|---|---|
| 3,651,661 A | 3/1972 | Darrow | |
| 4,118,262 A * | 10/1978 | Abbott | B29C 53/60 138/129 |
| 4,126,157 A * | 11/1978 | Roest | B29C 53/821 138/109 |
| 4,851,065 A | 7/1989 | Curtz | |
| 5,091,029 A | 2/1992 | Davis et al. | |
| 5,397,272 A | 3/1995 | Smiley et al. | |

(Continued)

FOREIGN PATENT DOCUMENTS

JP 5-269868 A * 10/1993

OTHER PUBLICATIONS

Machine Translation of Japanese Patent 5-269868, Date Unknown.*

*Primary Examiner* — Jeffry H Aftergut
(74) *Attorney, Agent, or Firm* — Hodgson Russ LLP (57) ABSTRACT

A low-cost method of manufacturing an all-composite composite torque tube includes winding fiber tow around a cylindrical mandrel and a plurality of eyelet forms held by an end fixture on the mandrel, whereby a flanged end coupling is formed. The method may include the use of a pre-woven composite fiber end sleeve configured to define the flanged end coupling. The wound fiber, and the end sleeve, are cured together in a single step. Metal eyelets may be installed in the bolt holes.

11 Claims, 8 Drawing Sheets

(56) References Cited

U.S. PATENT DOCUMENTS

| | | | |
|---|---|---|---|
| 5,685,933 A * | 11/1997 | Ohta | B29C 53/583 |
| | | | 156/169 |
| 7,335,108 B2 | 2/2008 | Lin et al. | |
| 7,419,435 B2 | 9/2008 | Borges et al. | |
| 7,682,256 B2 | 3/2010 | Brace et al. | |
| 7,874,925 B2 | 1/2011 | Dewhirst | |
| 8,025,580 B2 | 9/2011 | Genot et al. | |
| 8,118,958 B2 | 2/2012 | Lunin et al. | |
| 2002/0189749 A1 | 12/2002 | Shieh | |
| 2011/0192528 A1 | 8/2011 | Kozaki et al. | |
| 2012/0270006 A1 * | 10/2012 | McMillan | F01D 25/243 |
| | | | 428/77 |

* cited by examiner

ALL-COMPOSITE TORQUE TUBE WITH METAL EYELETS

FIELD OF THE INVENTION

The present invention relates generally to torque tubes (sometimes referred to as torque shafts) used on an aircraft utility or flight control drive line, or on any drive line that requires a torque tube for transmitting torque.

BACKGROUND OF THE INVENTION

A torque tube transmits static and dynamic torsional loads in power transmission applications. For example, torque tubes are commonly used in aircraft to provide power transmission for actuating and braking flight control surfaces, e.g. flaps and slats, and for actuating aircraft doors and door latches. Each end of a torque tube may be provided with a coupling feature configured for mechanically coupling the torque tube to another transmission mechanism in the drive line. For example, one or both ends of a torque tube may include a flange having an array or pattern of bolt holes used for coupling.

So-called "composite" torque tubes made by helically winding or wrapping carbon fiber tow around a cylindrical mandrel are widely used in the aircraft industry in part because they are lighter than metal torque tubes yet still meet critical strength requirements. Composite torque tubes also offer improved flexural rigidity and torsional rigidity. However, because the coupling features at the ends of the torque tube differ from and are more complex than the straight length of the torque tube between the ends, the coupling features are not formed of wrapped composite material. Instead, it is known to manufacture a metallic end fitting that includes the coupling feature, and form the torque tube as a hybrid assembly having a pair of metal end fittings connected by a straight tube of wrapped composite material. In this regard, see U.S. Pat. No. 7,335,108 (Lin et al.); U.S. Pat. No. 7,419,435 (Borges et al.); U.S. Pat. No. 7,682,256 (Brace et al.); U.S. Pat. No. 7,874,925 (Dewhirst); and U.S. Pat. No. 8,025,580 (Genot et al.). The metal end fittings add weight, and it is a challenge to ensure that the junction between the composite material and each metal end fitting is reliable and not prone to failure under loading.

U.S. Pat. No. 3,651,661 (Darrow), teaches making a composite torque tube having typical bolt-hole flanges by laying alternating plies of composite fabric on a cylindrical mandrel. The flanges are made by folding out fingers or strips provided in the fabric plies. This patent does not teach winding fiber tow.

U.S. Pat. No. 5,397,272 (Smiley et al.) describes an all-composite torque tube that teaches wrapping fiber around an arbor and integrally forming two yoke lugs of a universal joint at an end of the tube. The lugs extend parallel to one another in an axial direction of the torque tube and include respective holes aligned with one another along a diametric axis for receiving a coupling member of the universal joint.

Outside the torque tube art, U.S. Pat. No. 8,118,958 (Lunin et al.) teaches a method for manufacturing an output arm for a rotary actuator by winding a composite fiber filament about a pair of metal eyelets and a metal gear insert. The eyelets and gear insert are supported on a fixture during winding. The wound filament is then infused with resin and the resin is cured. The fixture is removed to yield a finished actuator arm.

A need remains for an all-composite torque tube having flanges with bolt holes at its opposite ends, wherein the torque tube is economical to manufacture and does not require metal end fittings.

SUMMARY OF THE INVENTION

The present invention provides a method for manufacturing a lightweight, all-composite torque tube at low-cost that involves a single structural curing step. The resulting torque tube has no torque-transmitting joints between composite material and metal, and is highly reliable.

In an embodiment of the invention, the manufacturing method comprises providing a cylindrical mandrel and positioning an end fixture on the mandrel, wherein the end fixture includes a backing surface radially enlarged relative to an outer surface of the mandrel and a plurality of openings through the backing surface. The method further comprises inserting a plurality of eyelet forms respectively into the plurality of openings of the end fixture, and winding a fiber tow around the mandrel and the plurality of eyelet forms. If dry fiber tow is used rather than pre-impregnated fiber tow, then the wound fiber tow is infused with a resin matrix. The method continues by curing the wound fiber tow to a C cure stage, thereby yielding a composite tube including an integral end flange having a plurality of bolt holes. The method may be completed by removing the eyelet forms, the end fixture, and the mandrel from the composite tube. Optionally, metal eyelets may be installed to reinforce the bolt holes of the flange.

A variation of the basic method described above includes providing a woven end sleeve including an axially extending stem, a radially enlarged flange layer at a distal end of the stem, a passage through the flange layer and the stem for receiving an end portion of the mandrel, and a plurality of bolt holes through the flange layer. The end sleeve is placed on the mandrel such that the flange layer of the end sleeve is in abutment against the backing surface of the end fixture, and the plurality of eyelet forms are inserted respectively through the plurality of bolt holes of the end sleeve and into the plurality of openings of the end fixture. The end sleeve may be woven of pre-impregnated fiber tow, or woven of dry fiber tow and subsequently infused with resin. The winding step of the basic method is modified to include winding the fiber tow around the stem of the end sleeve. The end sleeve and the wound fiber tow are cured together in a single curing step.

In a further variation of the method, the end sleeve is woven such that it fully forms a flanged end coupling of the torque tube, and a straight tube portion of the torque tube is formed by winding fiber tow around the cylindrical mandrel and part of the stem of the end sleeve. The wound fiber tow and end sleeve are cured together in a single curing step.

BRIEF DESCRIPTION OF THE DRAWINGS

The nature and mode of operation of the present invention will now be more fully described in the following detailed description of the invention taken with the accompanying drawing figures, in which.

DETAILED DESCRIPTION OF THE INVENTION

Figures 1, 2:
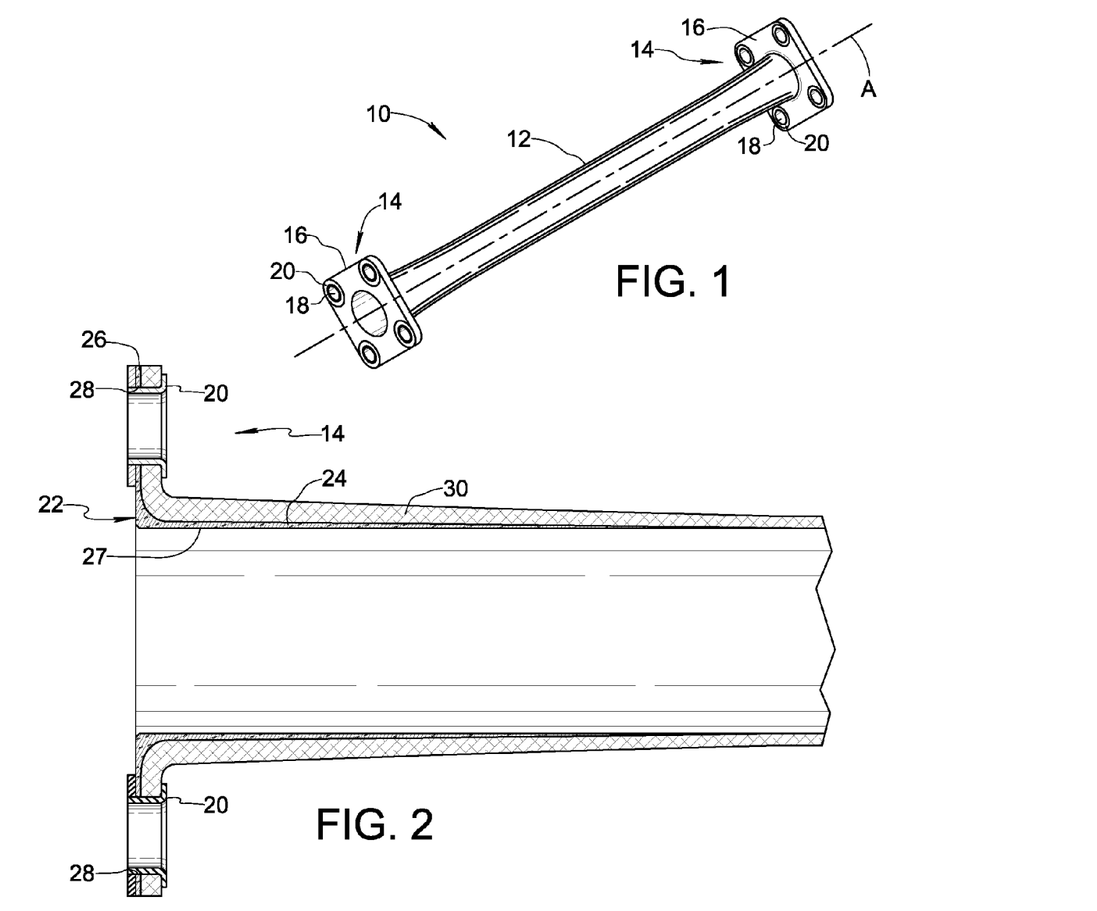
FIG. 1 is an orthogonal view of a composite torque tube generally embodying the present invention.
FIG. 2 is a longitudinal cross-sectional view showing an end portion of a composite torque tube formed in accordance with a first embodiment of the present invention.

FIG. 1 depicts a composite torque tube 10 formed by a method of the present invention. Composite torque tube 10 generally comprises a pair of end couplings 14 connected by an intermediate tube portion 12. Reference character A denotes a longitudinal axis of torque tube 10. Each end coupling 14 includes a flange 16 that extends radially outward relative to an outer cylindrical surface of tube portion 12, and a plurality of bolt holes 18 through flange 16 for use in attaching end coupling 14 to another part of a transmission drive system. In the embodiments described herein, each end coupling 14 has four bolt holes 18, however more or fewer bolt holes may be provided depending upon the particular end use application and design requirements. A two-piece metal eyelet 20 may optionally be arranged in each bolt hole 18 to reinforce and protect the inner surface of the bolt hole from the bolt's clamping force. Torque tube 10 is completely formed of fiber-reinforced composite material, with the exception of optional metal eyelets 20.

FIG. 2 shows one end portion of composite torque tube 10 in greater detail to illustrate a first embodiment of the present invention. As will be described below, composite torque tube 10 of the first embodiment is formed using a pre-woven end sleeve 22 at each end, and a fiber tow winding 30 merging with each end sleeve 22. The constituent fibers of end sleeves 22 and fiber tow winding 30 reside in a thermosetting resin matrix that cures fully at an elevated temperature by undergoing an irreversible chemical reaction in which cross-linking of the resin molecules converts the resin to a stable solid (the C stage), whereby curing integrates the end sleeves 22 and fiber tow winding 30 into a solid structural composite material. The fibers used to weave end sleeves 22, and the fibers in fiber tow winding 30, may be pre-impregnated with the thermosetting resin matrix that is partially cured to a B stage of curing to provide a composite fiber material that is thickened and somewhat tacky in comparison to uncured "wet" layup material. As an alternative to using "prepreg" fiber material, dry fiber tow may be used to form end sleeves 22 and winding 30, and the constituent fibers may be vacuum infused after weaving and winding with a thermosetting resin matrix. The fibers may include, for example, carbon fibers, glass fibers, aramid fibers, boron fibers, and/or ceramic fibers.

Figure 3:
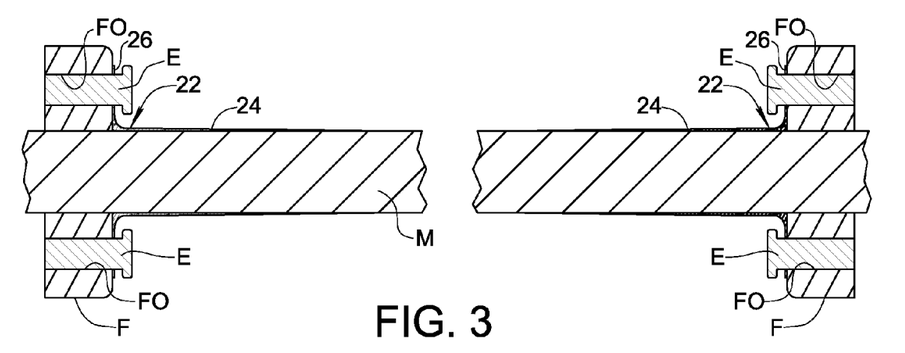
FIG. 3 is a longitudinal cross-sectional view illustrating a manufacturing setup for making the composite torque tube shown in FIG. 2.

Each end sleeve 22 is configured to include an axially extending stem 24, a radially enlarged flange layer 26 at a distal end of the stem, a passage 27 through the flange layer 26 and the stem 24 for receiving an end portion of a mandrel M (see FIG. 3), and a plurality of bolt holes 28 through flange layer 26.

Figure 5A:
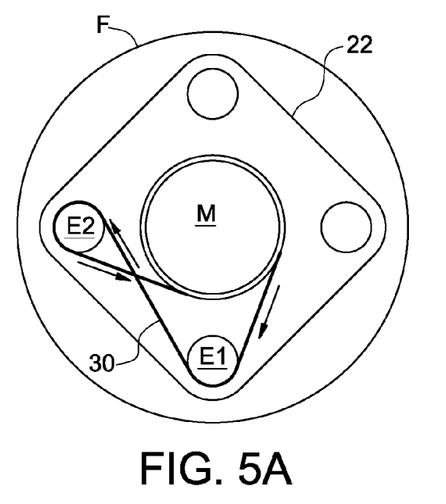
FIG. 5A is a view looking axially toward an end fixture of the manufacturing setup, illustrating a first eyelet winding step of the manufacturing method.
Figure 5B:
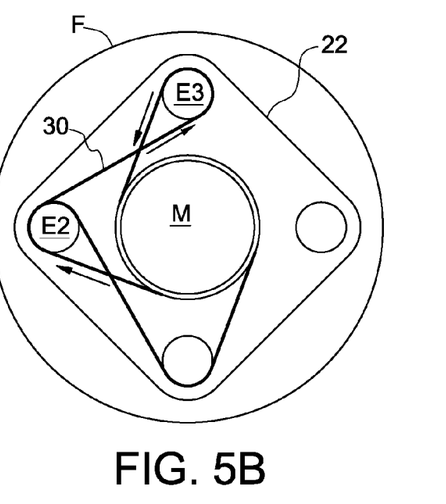
FIG. 5B is a view similar to that of FIG. 5A, illustrating a second eyelet winding step of the manufacturing method.
Figure 5C:
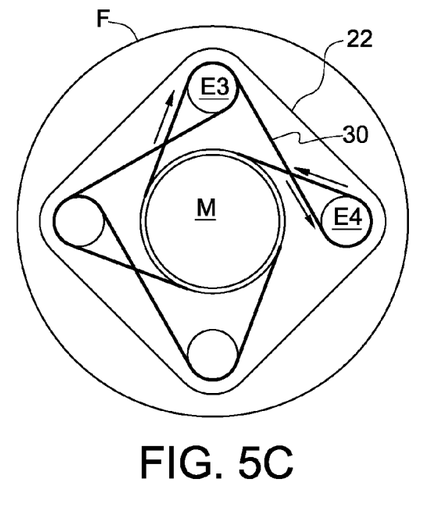
FIG. 5C is a view similar to that of FIG. 5A, illustrating a third eyelet winding step of the manufacturing method.
Figure 5D:
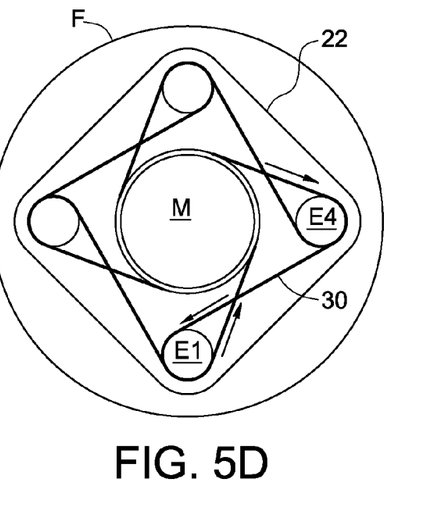
FIG. 5D is a view similar to that of FIG. 5A, illustrating a fourth eyelet winding step of the manufacturing method.
Figure 6:
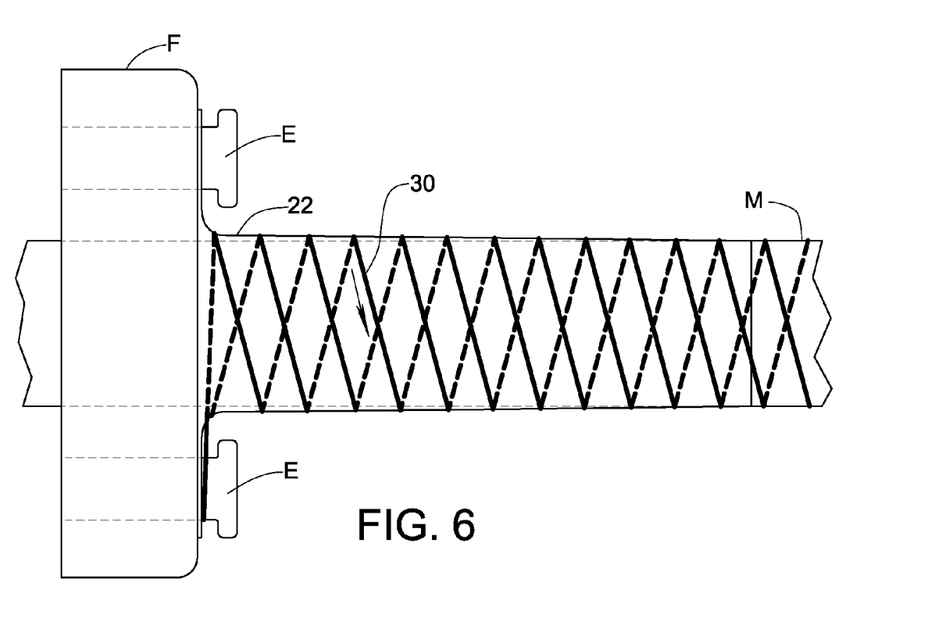
FIG. 6 is a view similar to that of FIG. 4, illustrating a reverse helical winding step of the manufacturing method.
Figure 7:
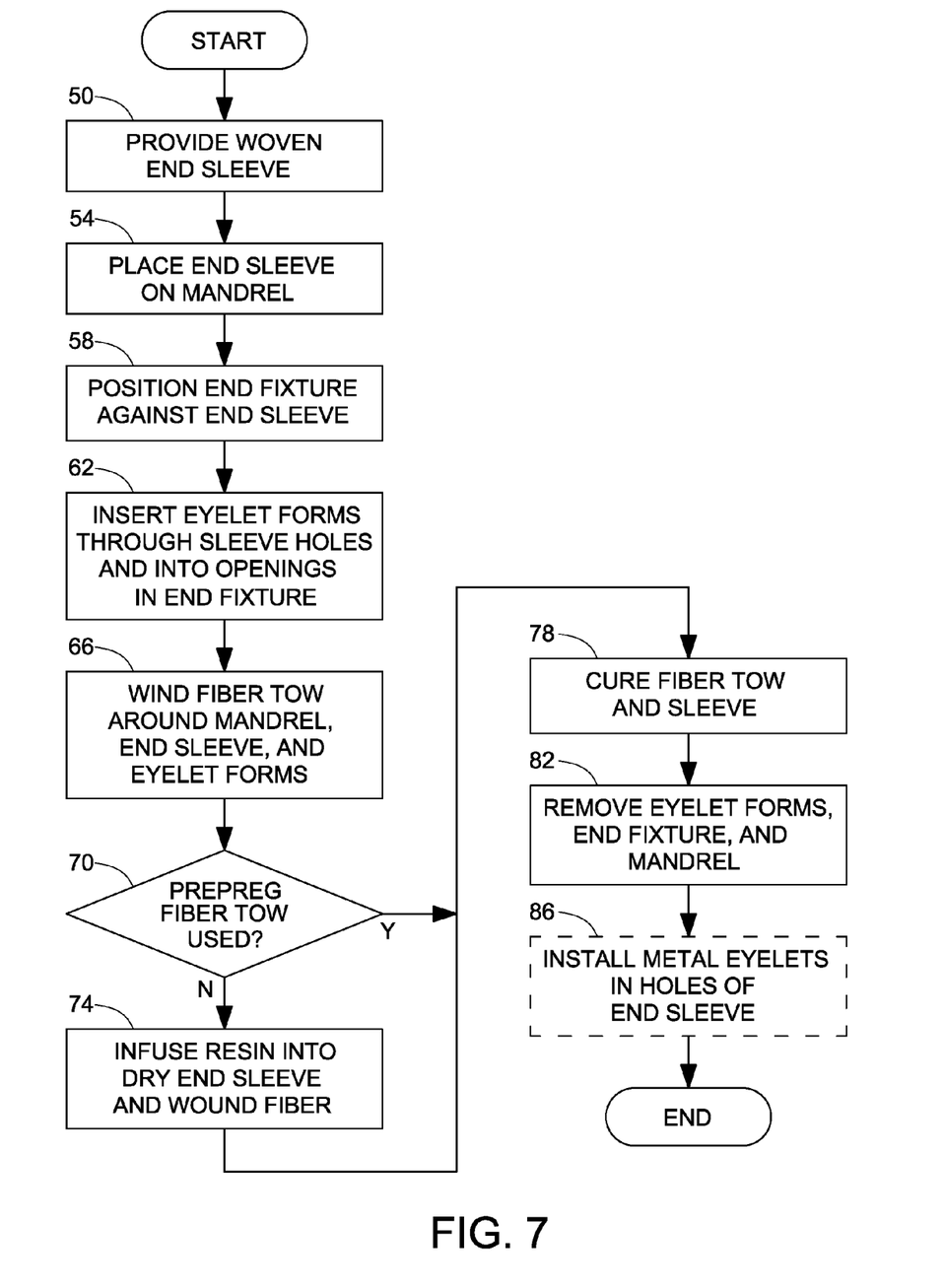
FIG. 7 is a flow diagram illustrating a method of making the composite torque tube shown in FIG. 1.

A method of manufacturing torque tube 10 in accordance with the first embodiment will now be described with reference to the flow diagram of FIG. 7 and with additional reference to FIGS. 3-6. In an initial step 50, at least one pre-woven end sleeve 22 is provided. In step 54, end sleeve 22 is placed on a cylindrical mandrel M. Next, in accordance with step 58, an end fixture F is positioned on mandrel M in abutment against flange layer 26 of end sleeve 22. End fixture F includes a plurality of openings FO respectively aligned with the plurality of bolt holes 28 of end sleeve 22. Manufacturing setup also includes step 62 of inserting a plurality of eyelet forms E respectively through the plurality of bolt holes 28 of end sleeve 22 and into the plurality of openings FO in end fixture F. This arrangement may be seen, for example, in FIG. 3.

Figure 4:
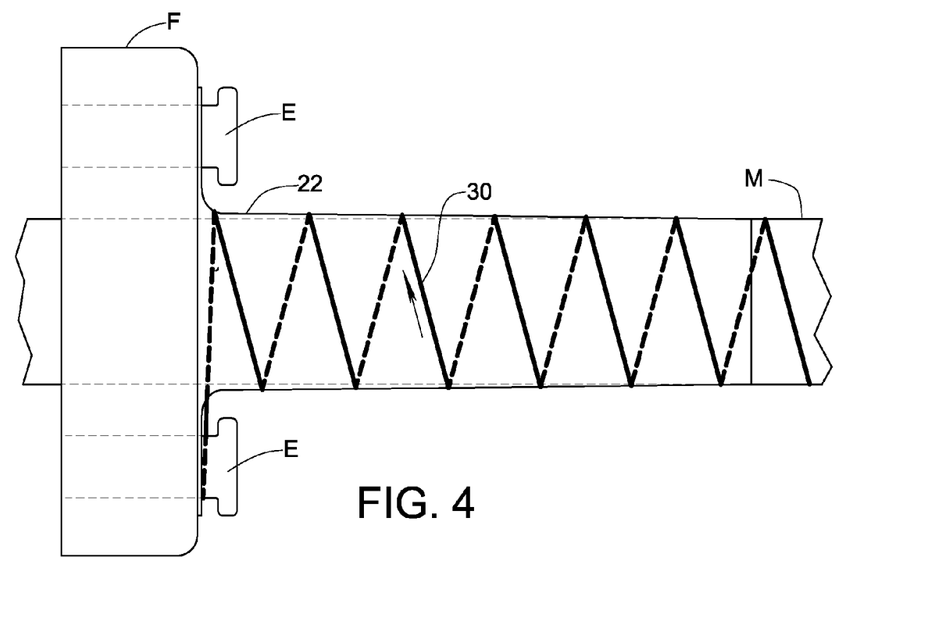
FIG. 4 is a view of one end of the manufacturing setup shown in FIG. 3, illustrating a helical winding step of a method for manufacturing the composite torque tube shown in FIG. 2.

The method continues at step 66 with winding fiber tow 30 around mandrel M, the stem 24 of the end sleeve 22, and the plurality of eyelet forms E. Winding step 66 is illustrated by FIGS. 4-6. Fiber tow 30 is helically wound around mandrel M so as to approach end sleeve 22 in an axial direction, as shown in FIG. 4. The helical winding continues until fiber tow 30 is wound around stem 24 and reaches flange layer 26. Then, fiber tow 30 is wound around two of the plurality of eyelet forms E as illustrated in FIG. 5A. More specifically, fiber tow 30 departs from stem 24 and is wound partially around a first one of the eyelet forms E1. As may be seen, fiber tow 30 may have an outer tangential approach to the first eyelet form E1. Fiber tow 30 departs from first eyelet form E1, is wound partially around a second one of the eyelet forms E2 and proceeds back to stem 24 of end sleeve 22. As shown in FIG. 5A, fiber tow 30 may have an inner tangential approach to second eyelet form E2, and the fiber tow leaving second eyelet form E2 may cross the fiber tow approaching second eyelet form E2 when viewed in the axial direction toward flange layer 26. Winding step 66 continues by helically winding fiber tow 30 around stem 24 and mandrel M in an axial direction away from flange layer 26.

As may be understood, another end sleeve 22 may be provided on mandrel M at a location corresponding to an opposite end of torque tube 10, and the winding pattern described above may be repeated in mirror-image fashion as fiber tow 30 approaches the opposing end sleeve. Helical winding continues back toward the first end sleeve 22. Once fiber tow 30 reaches flange layer 26, the eyelet winding pattern described above for first and second eyelet forms E1 and E2 is repeated for second eyelet form E2 and a third eyelet form E3 as illustrated in FIG. 5B. Fiber tow 30 departs from stem 24 and is wound partially around second eyelet form E2. Fiber tow 30 may have an outer tangential approach to second eyelet form E2. Fiber tow 30 departs from second eyelet form E2, is wound partially around third eyelet form E3, and proceeds back to stem 24 of end sleeve 22. As shown in FIG. 5B, fiber tow 30 may have an inner tangential approach to third eyelet form E3, and the fiber tow leaving third eyelet form E3 may cross the fiber tow approaching third eyelet form E3 when viewed in the axial direction toward flange layer 26.

Helical winding then continues axially along stem 24 and mandrel M away from depicted end sleeve 22, and a mirror image winding pattern may be formed at the opposite end before fiber tow 30 is again helically wound around mandrel M back toward the depicted end sleeve 22. Once fiber tow 30 returns to flange layer 26, the eyelet winding pattern described above is repeated for third eyelet form E3 and a fourth eyelet form E4 as illustrated in FIG. 5C. Fiber tow 30 departs from stem 24 and is wound partially around third eyelet form E3. Fiber tow 30 may have an outer tangential approach to third eyelet form E3. Fiber tow 30 departs from third eyelet form E3 and is wound partially around fourth eyelet form E4 before returning to stem 24 of end sleeve 22. Fiber tow 30 may have an inner tangential approach to fourth eyelet form E4, and the fiber tow leaving fourth eyelet form E4 may cross the fiber tow approaching fourth eyelet form E4 when viewed in the axial direction toward flange layer 26.

Fiber tow 30 is helically wound toward the opposite end, where the eyelet form winding pattern may be repeated in mirror image fashion, and is then helically wound back toward the depicted end sleeve 22. Once fiber tow 30 returns to flange layer 26, the eyelet winding pattern described above is repeated for fourth eyelet form E4 and a first eyelet form E1 as illustrated in FIG. 5D. Fiber tow 30 departs from stem 24 and is wound partially around fourth eyelet form E4. Fiber tow 30 may have an outer tangential approach to fourth eyelet form E4. Fiber tow 30 departs from fourth eyelet form E4 and is wound partially around first eyelet form E1 before returning to stem 24. Fiber tow 30 may have an inner tangential approach to first eyelet form E1, and the fiber tow leaving first eyelet form E1 may cross the fiber tow approaching first eyelet form E1 when viewed in the axial direction toward flange layer 26.

As will be understood, the winding pattern described above is continued in repeating fashion until material is built up to form end couplings 14 and tube portion 12. Those skilled in the art will recognize that the helical winding angle of fiber tow 30 may be varied during the winding step to achieve desired strength and flexural characteristics. Winding of the fiber tow may be performed using a conventional machine tool operated to rotate mandrel M and end fixtures F about their common longitudinal axis A in the manner of a lathe while a fiber tow feeder is reciprocated back and forth in the axial direction to feed fiber tow to the rotating assembly to achieve a predetermined winding pattern as the fiber tow is taken up by the rotating assembly. When the fiber tow wrapping step 66 is completed, a fiber-wrapped assembly is formed that includes the mandrel M, end fixtures F including eyelet forms E1 through E4, end sleeves 22, and the wrapped fiber tow 30.

Step 70 represents a decision block for branching flow depending upon whether or not prepreg fiber tow is used. If prepreg fiber tow is used, the wound fiber tow 30 and end sleeves 22 already include matrix resin in a partially cured B stage condition. In that case, the manufacturing method proceeds directly to curing step 78. If dry fiber tow is used, a resin matrix must be added to wound fiber tow 30 and woven end sleeves 22 by performing a resin infusion step 74 as known in the art of composite manufacturing, and then flow proceeds to curing step 78.

The next step 78 is curing the resin matrix containing the wound fiber tow 30 and woven fiber end sleeves 22 until the resin is fully cured to a C stage condition. Prior to curing, the composite assembly may be shrink-wrapped with a shrink-wrap tape, or vacuum bagged to remove volatiles and trapped air as is known in the art of composite manufacturing. Curing may be performed at an elevated temperature by placing the assembly in an oven. Alternatively, curing may be performed in an autoclave. The curing protocol will depend upon the size and configuration of torque tube 10, and the type of resin and fiber tow used. After the resin and fiber tow material is fully cured, the assembly is removed from the oven or autoclave, and the shrink wrapping or vacuum bag is removed.

In step 82, eyelet forms E1 through E4 and end fixtures F are removed, and mandrel M is withdrawn by sliding it axially out of the assembly. The remaining structure comprises an all-composite torque tube 10. The all-composite torque tube may be in finished form without metal eyelets in bolt holes 18. Alternatively, if metal eyelets 20 are desired to protect and reinforce bolt holes 18, eyelets 20 may be installed in an optional step 86. Eyelets 20 may be two-piece metal eyelets positioned through bolt holes 18 and crimped using a crimping tool.

Figure 8:
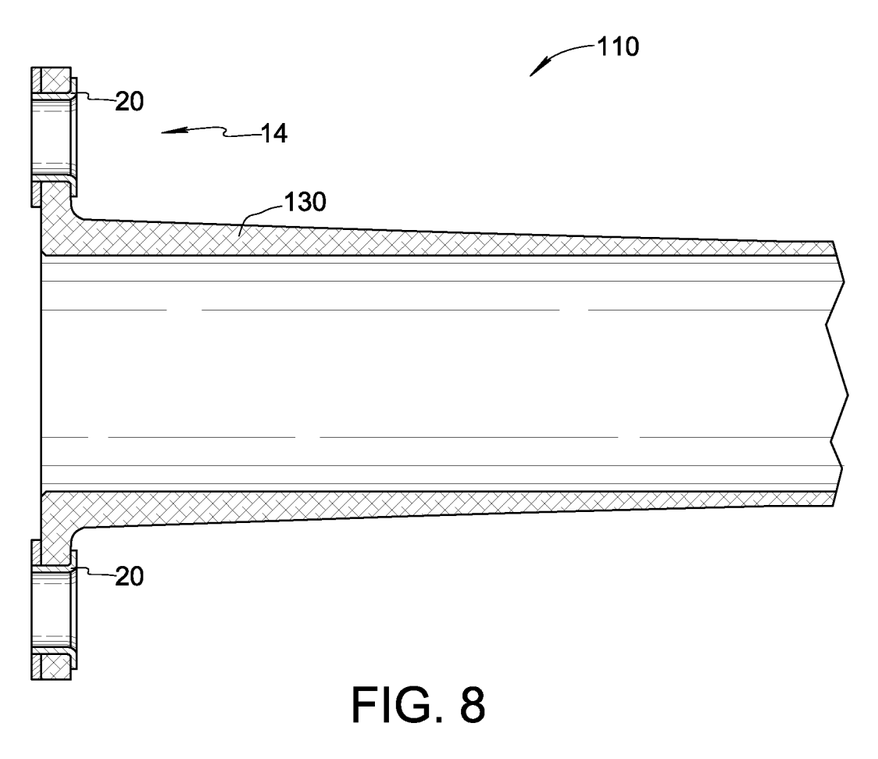
FIG. 8 is a longitudinal cross-sectional view showing an end portion of a composite torque tube formed in accordance with a second embodiment of the present invention.
Figure 9:
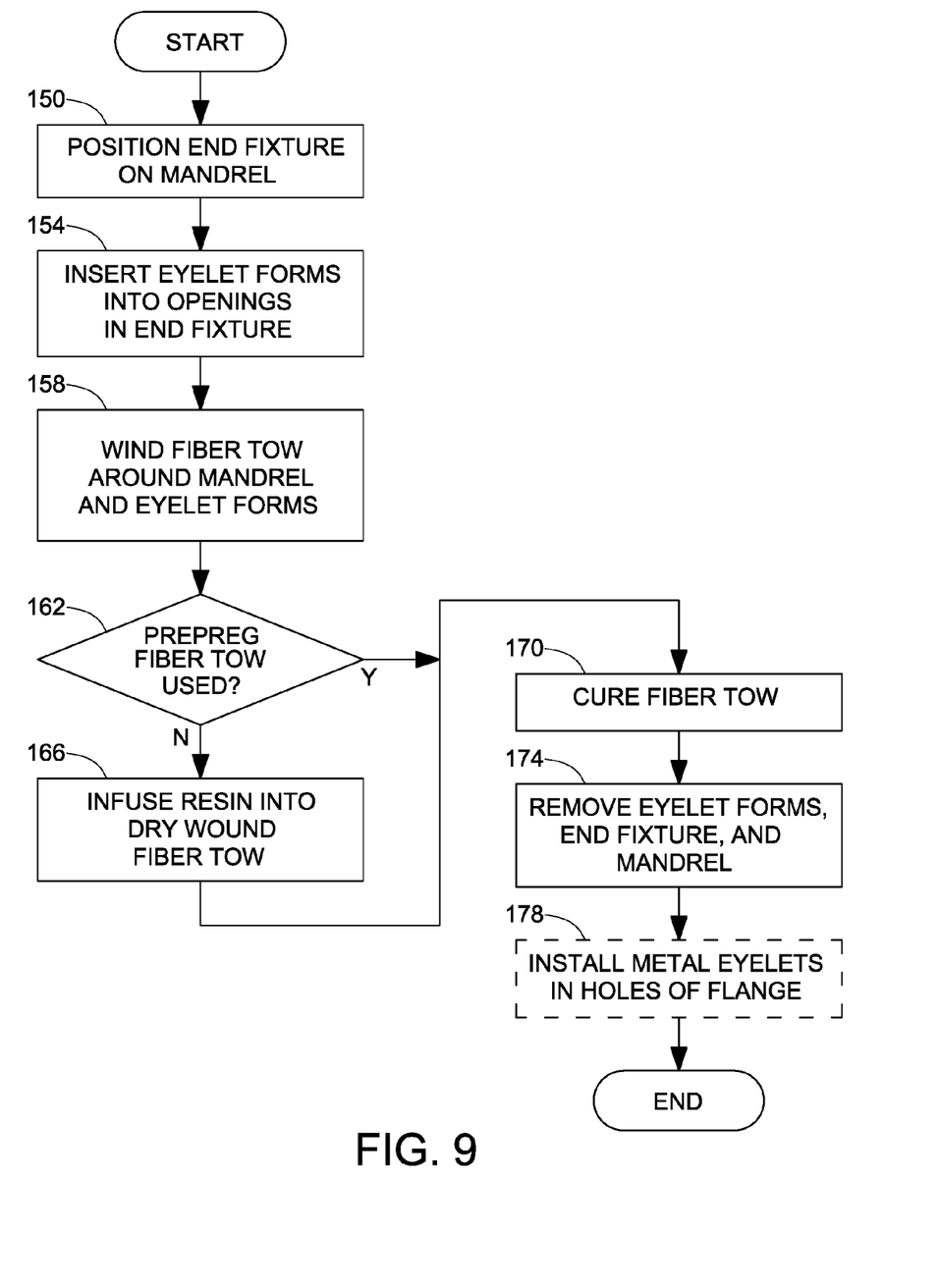
FIG. 9 is a flow diagram illustrating a method of making the composite torque tube shown in FIG. 8.

Attention is now directed to FIGS. 8 and 9 illustrating a torque tube 110 and manufacturing method in accordance with a second embodiment of the present invention. Torque tube 110 is formed in a manner generally similar to torque tube 10 of the first embodiment, except that pre-woven end sleeves 22 are not used in forming end couplings 14. Instead, the entire composite structure of torque tube 110, including end fittings 14, is formed completely by winding fiber tow 130 directly around mandrel M and around the eyelet forms E held by fixture F. As in the first embodiment, metallic eyelets 20 may be provided to protect bolt holes 18.

A method of manufacturing torque tube 110 in accordance with the second embodiment is illustrated by the flow diagram of FIG. 9. In an initial step 150, at least one end fixture F is positioned on mandrel M. Step 154 involves inserting a plurality of eyelet forms E respectively into the plurality of openings FO in end fixture F. Next, in step 158, fiber tow 130 is wound around mandrel M and eyelet forms E. The same winding pattern described above in connection with step 66 of the first embodiment may be used for the second embodiment. If fiber tow 130 is prepreg fiber tow, decision step 162 advances flow to curing step 170. If fiber tow 130 is dry fiber tow, then decision step 162 directs flow to resin infusion step 166 before flow proceeds to curing step 170. After curing is completed, the eyelet forms E, end fixture F and mandrel M are removed in step 174. The remaining structure comprises an all-composite torque tube 110. The all-composite torque tube may be in finished form without metal eyelets 20, or metal eyelets 20 may be installed in optional step 178 to protect and reinforce bolt holes 18.

Figure 10:
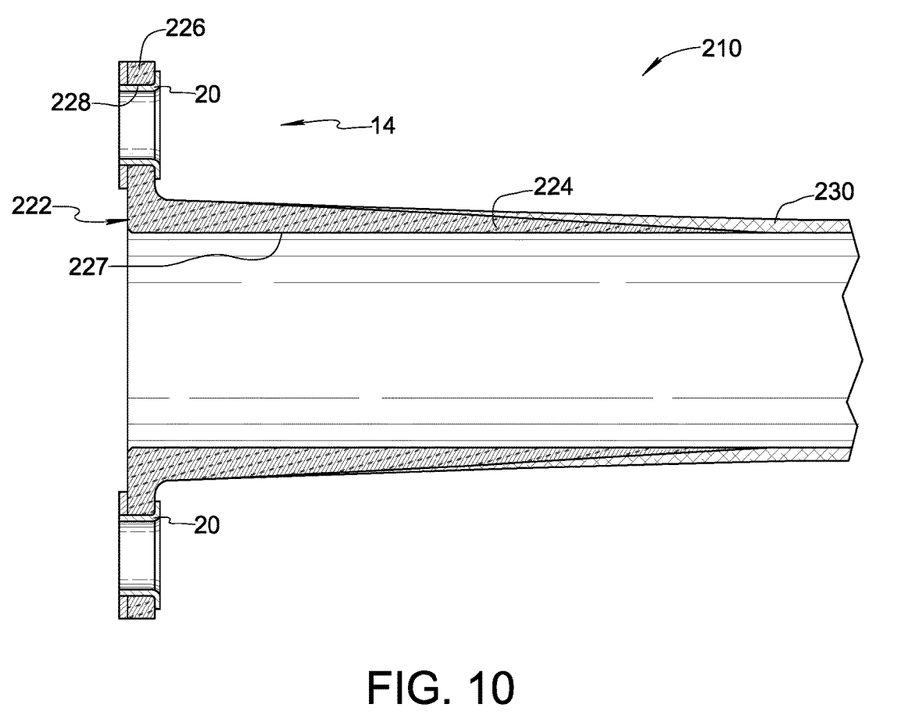
FIG. 10 is a longitudinal cross-sectional view showing an end portion of a composite torque tube formed in accordance with a third embodiment of the present invention.
Figure 11:
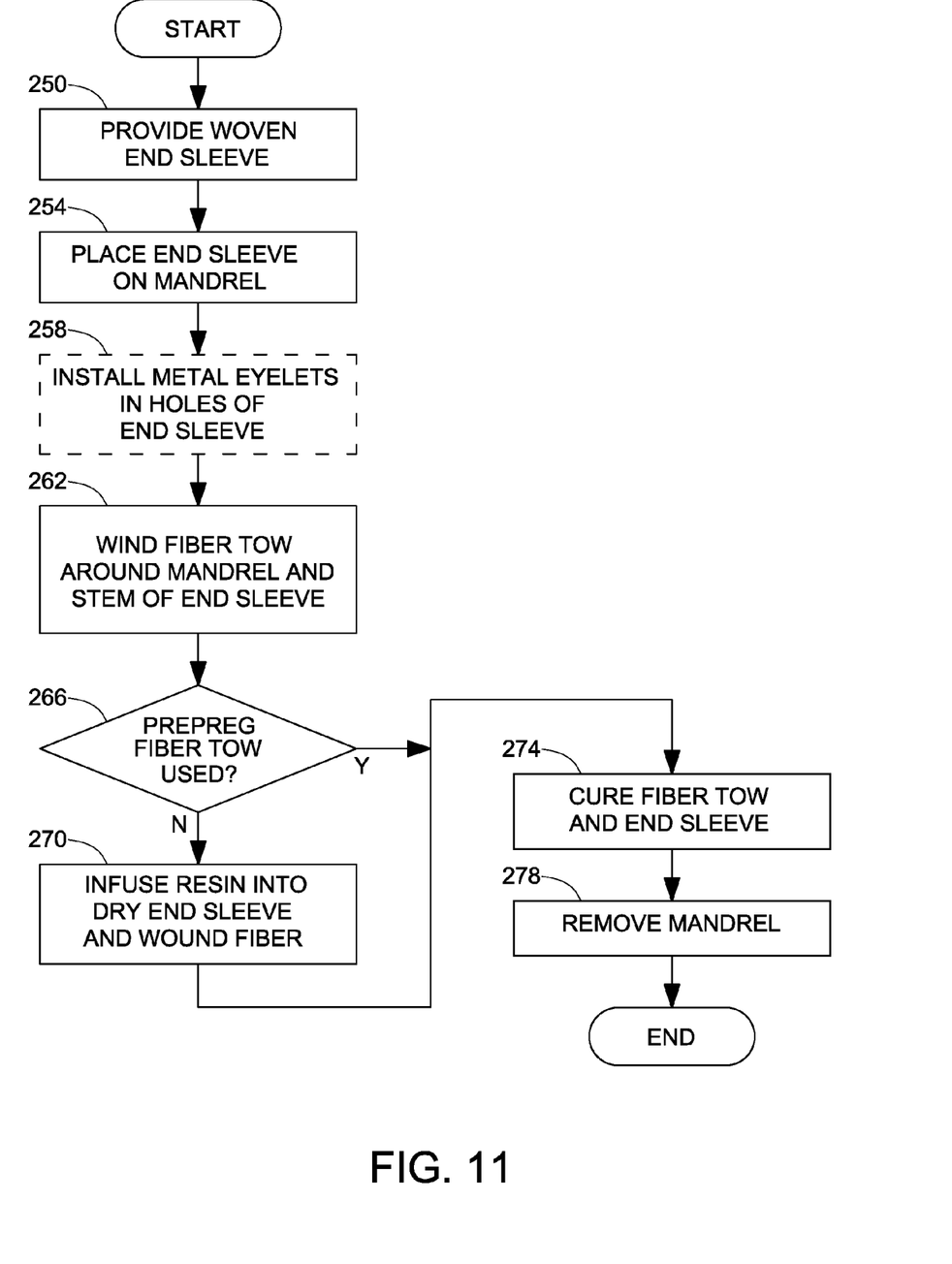
FIG. 11 is a flow diagram illustrating a method of making the composite torque tube shown in FIG. 10.

FIGS. 10 and 11 illustrate a torque tube 210 and manufacturing method in accordance with a third embodiment of the present invention. Torque tube 210 is formed in a manner generally similar to torque tube 10 of the first embodiment, except that pre-woven end sleeves 22 are replaced by a modified end sleeve 222 having a stem 224 that grows radially and merges with an axially thickened flange 226 to form end couplings 14. Thus, in torque tube 210, each end coupling 14 is formed completely by pre-woven end sleeve 222, and tube portion 12 is formed by winding a fiber tow 230 around mandrel M and part of stem 224.

A method of manufacturing torque tube 210 in accordance with the third embodiment is illustrated by the flow diagram of FIG. 11. In an initial step 250, at least one pre-woven end sleeve 222 is provided. In step 254, end sleeve 222 is placed on a cylindrical mandrel M. Step 258 represents an optional step wherein metal eyelets 20 are installed in bolt holes 228. Next, in step 262, fiber tow 230 is wound around mandrel M and stem 224 of end sleeve 222. For the third embodiment, the winding step 262 is simplified relative to the previous embodiments and involves helical winding back and forth along mandrel M. If fiber tow 230 is prepreg fiber tow, decision step 266 advances flow to curing step 274. If fiber tow 230 is dry fiber tow, then decision step 266 directs flow to resin infusion step 270 before flow proceeds to curing step 274. After curing of end sleeve 222 and wound fiber tow 230 is completed, mandrel M is removed in step 278. The remaining structure comprises an all-composite torque tube 210 having optional metal eyelets 20.

While the invention has been described in connection with exemplary embodiments, the detailed description is not intended to limit the scope of the invention to the particular forms set forth. The invention is intended to cover such alternatives, modifications and equivalents of the described embodiment as may be included within the scope of the invention.

What is claimed is:

1. A method of manufacturing a composite torque tube, the method comprising the steps of:
   providing a cylindrical mandrel;
   positioning an end fixture on the mandrel, the end fixture including a backing surface radially enlarged relative to an outer surface of the mandrel and a plurality of openings through the backing surface;
   inserting a plurality of eyelet forms respectively into the plurality of openings of the end fixture, wherein the eyelet forms extend parallel to an axial direction of the cylindrical mandrel;
   winding a fiber tow around the mandrel and the plurality of eyelet forms;
   infusing the wound fiber tow with a resin matrix, or using fiber tow pre-impregnated with a resin matrix in a B cure stage as the fiber tow for the winding step;
   curing the wound fiber tow to a C cure stage, thereby yielding a composite tube including an integral end flange having a plurality of axially extending bolt holes; and
   removing the eyelet forms, the end fixture, and the mandrel from the composite tube after the steps of winding, infusing, and curing have been completed.

2. The method according to claim 1, further comprising the steps of:
   providing a woven end sleeve including an axially extending stem, a radially enlarged flange layer at a distal end of the stem, a passage through the flange layer and the stem for receiving an end portion of the mandrel, and a plurality of bolt holes through the flange layer;
   placing the end sleeve on the mandrel such that the flange layer of the end sleeve is in abutment against the backing surface of the end fixture, wherein the plurality of eyelet forms are inserted respectively through the plurality of bolt holes of the end sleeve and into the plurality of openings of the end fixture; and
   infusing the end sleeve with a resin matrix, or using fiber tow pre-impregnated with a resin matrix in a B cure stage to weave the end sleeve;
   wherein the winding step includes winding the fiber tow around the stem of the end sleeve;
   wherein the curing step includes curing the end sleeve to a C cure stage along with the wound fiber tow.

3. The method according to claim 1, further comprising the step of installing a plurality of metal eyelets respectively in the plurality of bolt holes of the integral end flange.

4. The method according to claim 2, further comprising the step of installing a plurality of metal eyelets respectively in the plurality of bolt holes of the integral end flange.

5. A composite torque tube manufactured by the method of claim 1.

6. A method of manufacturing a composite torque tube, the method comprising the steps of:
   providing a cylindrical mandrel;
   positioning an end fixture on the mandrel, the end fixture including a backing surface radially enlarged relative to an outer surface of the mandrel and a plurality of openings through the backing surface;
   inserting a plurality of eyelet forms respectively into the plurality of openings of the end fixture;
   winding a fiber tow around the mandrel and the plurality of eyelet forms, wherein the step of winding the fiber tow includes, in ordered sequence:
      helically winding the fiber tow around the mandrel and the stem of the sleeve in an axial direction toward the flange layer;
      winding the fiber tow partially around a first one of the eyelet forms;
      winding the fiber tow partially around a second one of the eyelet forms and back to the stem of the sleeve such that the fiber tow leaving the second eyelet form crosses the fiber tow approaching the second eyelet form when viewed in the axial direction toward the flange layer; and
      helically winding the fiber tow around the stem and the mandrel in an axial direction away from the flange layer;
   infusing the wound fiber tow with a resin matrix, or using fiber tow pre-impregnated with a resin matrix in a B cure stage as the fiber tow for the winding step;
   curing the wound fiber tow to a C cure stage, thereby yielding a composite tube including an integral end flange having a plurality of bolt holes; and
   removing the eyelet forms, the end fixture, and the mandrel from the composite tube.

7. The method according to claim 6, wherein the fiber tow has an outer tangential approach to the first one of the eyelet forms and an inner tangential approach to the second one of the eyelet forms.

8. A method of manufacturing a composite torque tube, the method comprising the steps of:
   providing a cylindrical mandrel;
   providing a woven end sleeve including an axially extending stem, a radially enlarged flange at a distal end of the stem, a passage through the flange and the stem for receiving an end portion of the mandrel, and a plurality of bolt holes extending axially through the flange;
   placing the end sleeve on a mandrel;
   winding a fiber tow around the mandrel and the stem of the end sleeve;
   infusing the wound fiber tow and the end sleeve with a resin matrix, or using fiber tow pre-impregnated with a resin matrix in a B cure stage as the fiber tow for the winding step and to weave the end sleeve;
   curing the fiber tow and the end sleeve to a C cure stage, thereby yielding a composite tube including an integral end flange having a plurality of axially extending bolt holes; and
   removing the mandrel.

9. The method according to claim 8, further comprising the step of positioning a plurality of metal eyelets respectively in the plurality of bolt holes of the end sleeve prior to the step of curing.

10. The method according to claim 8, wherein the step of winding the fiber tow includes, in ordered sequence:
   helically winding the fiber tow around the mandrel and the stem of the end sleeve in an axial direction toward the flange of the end sleeve; and
   helically winding the fiber tow around the stem of the end sleeve and the mandrel in an axial direction away from the flange of the end sleeve.

11. A composite torque tube manufactured by the method of claim 8.

\* \* \* \* \*